(12) United States Patent
Cassidy et al.

(10) Patent No.: US 7,772,483 B2
(45) Date of Patent: Aug. 10, 2010

(54) SENSOR FOR MEASURING THE TEMPERATURE OF FLOWING METALS

(75) Inventors: John Cassidy, Warwick, PA (US); Thomas A. Nordon, Jr., Harleysville, PA (US); Thomas C. Coleman, Jr., Beaver, PA (US)

(73) Assignee: Heraeus Electro-Nite International N.V., Houthalen (BE)

( * ) Notice: Subject to any disclaimer, the term of this patent is extended or adjusted under 35 U.S.C. 154(b) by 1137 days.

(21) Appl. No.: 11/279,013

(22) Filed: Apr. 7, 2006

(65) Prior Publication Data

US 2006/0225774 A1    Oct. 12, 2006

Related U.S. Application Data

(60) Provisional application No. 60/669,096, filed on Apr. 7, 2005.

(51) Int. Cl.
*H01L 35/00*    (2006.01)
*G01K 1/08*    (2006.01)

(52) U.S. Cl. .................... 136/234; 374/140; 204/409

(58) Field of Classification Search .............. 204/409; 136/234, 232; 374/179, 139, 140, 208, 100
See application file for complete search history.

(56) References Cited

U.S. PATENT DOCUMENTS

| 4,645,865 | A | * | 2/1987 | Cassidy | 136/234 |
| 4,692,556 | A | * | 9/1987 | Bollen et al. | 136/234 |
| 4,778,281 | A | * | 10/1988 | Falk | 374/140 |
| 5,275,488 | A | * | 1/1994 | Stelts | 374/140 |

* cited by examiner

*Primary Examiner*—Nam X Nguyen
*Assistant Examiner*—J. Christopher Ball
(74) *Attorney, Agent, or Firm*—Panitch Schwarze Belisario & Nadel LLP

(57) ABSTRACT

An immersion thermocouple is described. The immersion thermocouple includes a heat resistant sheathing, the interior of which is substantially filled with a heat resistant cement, a first U-shaped tube enclosing a thermocouple fixed in the heat resistant cement, and a second U-shaped tube fixed in the heat resistant cement. The second U-shaped tube bridges the first U-shaped tube at an angle of approximately ninety degrees. The immersion thermocouple also includes a shield circumferentially surrounding the first and the second U-shaped tubes proximate to where the first and the second U-shaped tubes are fixed to the heat resistant cement.

8 Claims, 2 Drawing Sheets

US 7,772,483 B2

SENSOR FOR MEASURING THE TEMPERATURE OF FLOWING METALS

CROSS-REFERENCE TO RELATED APPLICATIONS

This application claims the benefit of U.S. Provisional Application No. 60/669,096, filed Apr. 7, 2005, entitled "Temperature Sensor for Measuring the Temperature of Molten Metal Under High Rate of Flow Conditions", which is hereby incorporated by reference in its entirety.

BACKGROUND OF THE INVENTION

1. Field of the Invention

This invention relates to a temperature measurement device and more particularly, to a device for the measurement of the temperature of a molten metal.

2. Background of the Invention

FIGS. 1 and 2 show the configuration of a conventional immersion sensor 10 for measuring the temperature of molten metals. The sensor 10 includes a thermocouple element 11 consisting of pairs of noble metal wires, typically platinum and alloys of platinum and rhodium. The thermocouple 11 is sheathed in a fused silica tube 12. The fused silica tube 12 is bent in the shape of a "U" such that a junction 13 of the Pt/Pt—Rd thermocouple is at the top of the bend. The wires of the thermocouple 11 exit the U-shaped silica tube 12 at open ends of the tube 12 opposite the bend in the tube 12. The wires of the thermocouple 11 are attached to copper alloy wires 14 of a type known to those skilled in the art. The assembly of thermocouple 11, the U-shaped tube 12 and the wires of the thermocouple 11 is potted in a heat resistant cement 15 filling the interior of a heat resistant ceramic body 16. This conventional construction, when coupled with suitable voltage measuring instrumentation, (not shown), is capable of accurately measuring the temperature of molten metal up to the temperature of melting of the thermocouple metals.

When sensors of this type are immersed in molten metal where the metal is flowing in a current, the fused silica tube 12, used to support the thermocouple element 11, can break or bend in the direction of the metal flow (see FIG. 3). Since fused silica is a glass, there exists a temperature where the fused silica begins to exhibit visco-elastic behavior. At temperatures lower than about 1000° C. the fused silica tube 12 tends to break as a response to the pressure of the flowing molten metal. In general there is no measurable viscous behavior below this temperature. Above 1000° C., the fused silica tube 12 deforms with the amount of permanent deformation depending upon the temperature, the amount of applied load and the purity of the fused silica. The problem of bending or breaking is more acute when the flow of molten metal is in a direction perpendicular to the plane of the fused silica "U" tube, as shown in FIG. 3.

In order to mitigate the bending or breaking of the fused silica tube, one approach suggested by the prior art is that of protecting the fused silica tube with a covering of higher temperature refractory material. Besides being more costly, the addition of higher temperature refractory materials on the fused silica tube introduces a mismatch of thermo-expansion between the fused silica tube, (very little expansion), and the added new material. When properly arranged as one skilled in the art would attempt, i.e., locating the faster expanding materials on the free surface of the U-shaped tube towards the molten metal in order to minimize the differences of thermo-expansion, a separation distance is inadvertently added between the temperature sensing element and the molten metal bath. This separation increases the thermo-response time of the sensor and therefore increases the exposure time of the sensor to the harsh environment resulting in a reduction of performance through failure of other components of the sensor.

The prior art also suggests substituting higher temperature materials for the fused silica tubes. Generally, the available higher temperature materials are not suitable due to commercial cost considerations. Alternatively, additional layers of materials may be added to the fused silica tube to reduce the deformation of the tube. Such an approach generally results in an unsuitable thermo-response time to a temperature change. Another approach of adding sleeves to the existing silica tube is not cost effective.

SUMMARY OF THE INVENTION

The present invention comprises an immersion thermocouple comprising: a heat resistant sheathing, the interior of which is substantially filled with a heat resistant cement; a first U-shaped tube fixed in the heat resistant cement, said first U-shaped tube enclosing a thermocouple; and a second U-shaped tube fixed in the heat resistant cement, said second U-shaped tube bridging said first U-shaped tube at an angle of approximately ninety degrees.

A further aspect of the invention comprises an immersion thermocouple comprising: a heat resistant sheathing, the interior of which is substantially filled with a heat resistant cement; a U-shaped tube fixed in the heat resistant cement, said U-shaped tube enclosing a thermocouple; and a shield circumferentially surrounding the U-shaped tube proximate to where the U-shaped tube is fixed to the heat resistant cement.

Another aspect of the invention comprises an immersion thermocouple comprising a first U-shaped tube fixed in the heat resistant cement, said first U-shaped tube enclosing a thermocouple; a second U-shaped tube fixed in the heat resistant cement, said second U-shaped tube bridging said first U-shaped tube at an angle of approximately ninety degrees; and a shield circumferentially surrounding the first and the second U-shaped tubes proximate to where the first and the second U-shaped tubes are fixed to the heat resistant cement.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
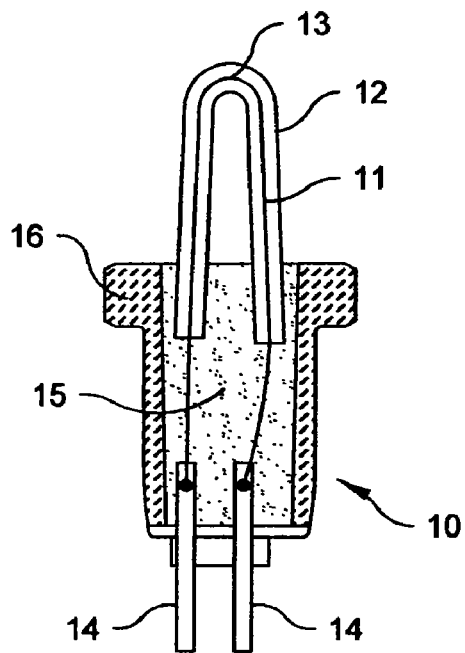
FIG. 1 is a cross sectional plan view of a conventional immersion thermocouple.
Figure 2:
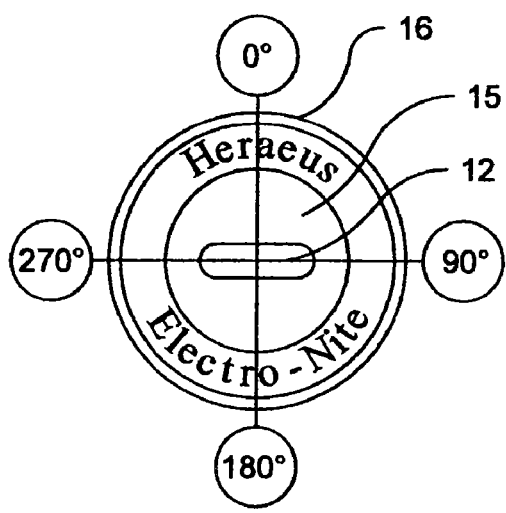
FIG. 2 is an elevational view of the conventional immersion thermocouple shown in FIG. 1 showing a U-shaped tube enclosing a thermocouple.
Figure 4:
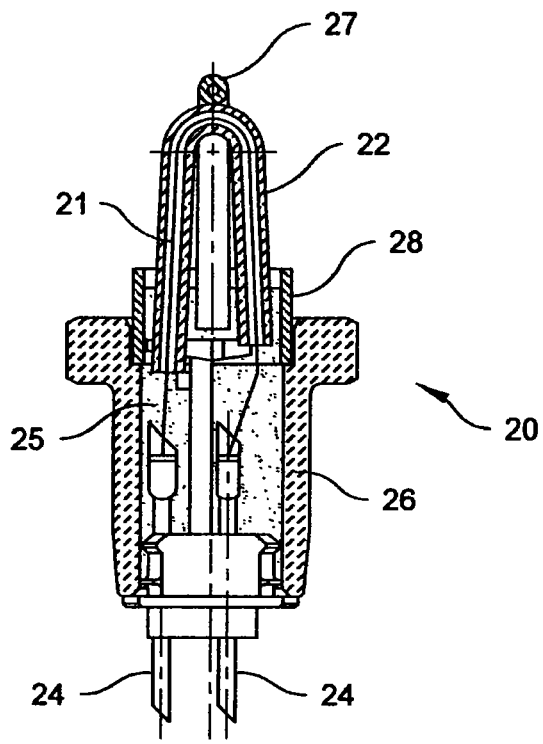
FIG. 4 is a cross sectional plan view of a preferred embodiment of an immersion thermocouple in accordance with the present invention.
Figure 3:
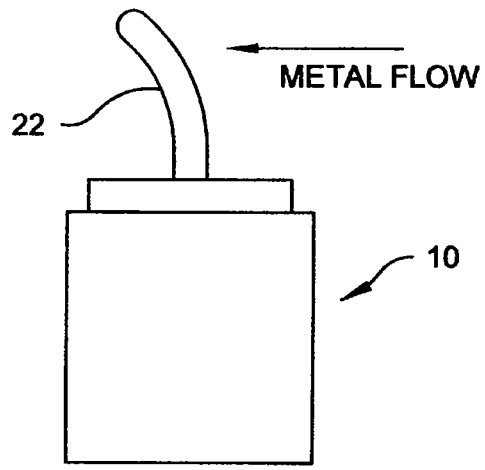
FIG. 3 is a diagram showing the effect of flowing metal on the conventional immersion thermocouple of FIGS. 1 and 2 when the flow is perpendicular to the plane of the U-shaped tube.
Figure 5:
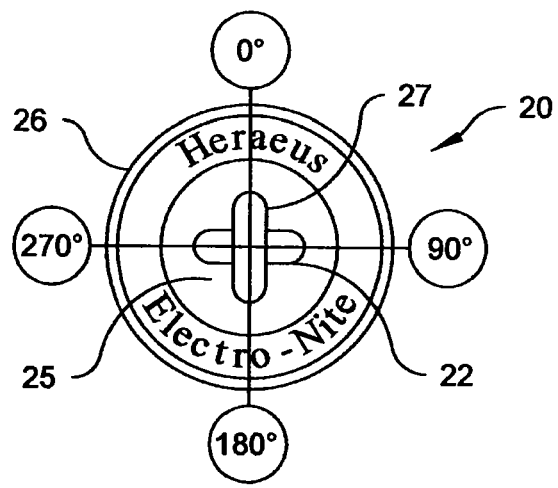
FIG. 5 is an elevational view of the immersion thermocouple shown in FIG. 4.

Referring now to FIGS. 4 and 5 there is shown a preferred embodiment of an immersion thermocouple 20 for measuring the temperature of a flowing metal in accordance with a preferred embodiment of the present invention.

The preferred embodiment of the immersion thermocouple 20 includes a heat resistant sheathing 26, preferably made of a ceramic material. Preferably, the interior the sheathing 26 is substantially filled with a heat resistant cement 25 of a type known well to those skilled in the art. A first U-shaped tube 22 enclosing a thermocouple 21 is fixed in the heat resistant cement 25. A second U-shaped tube 27, is also fixed in the heat resistant cement 25. The second U-shaped tube 27 has a height greater than the first U-shaped tube 22 and bridges over the first U-shaped tube 22 proximate to a top of the first U-shaped tube 22. Preferably, the second U-shaped tube 27 touches the first U-shaped tube 22 without bonding to the first U-shaped tube. However, the second U-shaped tube 27 is not required to touch the first U-shaped tube 22 to be within the scope of the invention. The second U-shaped tube 27 is of roughly the same shape and construction as the first U-shaped tube 22 containing the thermocouple 21, except for its added height. The second U-shaped tube 27 provides bracing of the first U-shaped tube 22 against high velocity molten metal flow. Preferably, the plane of the second U-shaped tube 27 is rotated approximately 90 degrees from the plane of the first U-shaped tube 22, as shown in FIG. 5, but angles more or less from 90 degrees provide adequate support for the element 22.

Preferably, the first and the second U-shaped tubes 22, 27 are made of fused silica. However, the first and the second U-shaped tubes could be made of borosilicate glass and still be within the scope of the invention.

The thermocouple element 21 consists of pairs of noble metal wires, typically platinum and alloys of platinum and rhodium. The thermocouple wires exit the U-shaped tube 22 at open ends of the tube 22 opposite the bend in the tube 22. The wires of the thermocouple 21 are attached to copper alloy wires 24 of a type known to those skilled in the art. The assembly of thermocouple 21, the U-shaped tube 22 and the copper alloy wires 24 is potted in the heat resistant cement 25 which substantially fills the interior of a heat resistant sheathing 26.

The preferred embodiment of the immersion thermocouple 20 also includes a shield 28 circumferentially surrounding the first and the second U-shaped tubes 22, 27 proximate to where the first and the second U-shaped tubes 22, 27 are fixed to the heat resistant cement 25. The cement 25 between the glass shield 28 and the U-shaped tubes 22, 27 is the same cement 25 used in the remainder of the interior of the sheathing 26. Consequently, differential thermo-expansion difficulties are not introduced by a second type of cement having dissimilar thermal expansion properties.

The shield 28 serves to deflect and diminish the strength of molten metal flow by creating turbulence near the bend of the first U-shaped tube 22, reducing the shearing effects of the molten metal flow on the U-shaped tube 22. Preferably, the shield 28 is made of the same material as the first and the second U-shaped tubes 22, 27. However, the shield 28 could be made of another material provided that the material matched the temperature coefficient of expansion of the heat resistant cement 25.

Depending upon the application, the immersion thermocouple 20 could include only the second U-shaped tube 27 or the shield 28 and still be within the spirit and scope of the invention.

The present invention describes two advances in the construction of immersion thermocouples that allow immersion thermocouples to be used with flowing metals. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An immersion thermocouple comprising:
   a heat resistant sheathing, an interior of which is substantially filled with a heat resistant cement;
   a first U-shaped tube fixed in the heat resistant cement, said first U-shaped tube enclosing a thermocouple; and
   a second U-shaped tube fixed in the heat resistant cement, said second U-shaped tube bridging said first U-shaped tube at an angle of approximately ninety degrees, a portion of each of the first and the second U-shaped tubes extending outside the heat resistant sheathing, wherein the first and the second U-shaped tubes are composed of a material selected from the group consisting of fused silica and borosilicate glass.

2. The immersion thermocouple of claim 1, further including a shield circumferentially surrounding the first and the second U-shaped tubes proximate to where the first and the second U-shaped tubes are fixed to the heat resistant cement.

3. The immersion thermocouple of claim 2, wherein the shield is composed of a material selected from the group consisting of fused silica and borosilicate glass.

4. The immersion thermocouple of claim 2, wherein the shield is made of the same material as the first and the second U-shaped tubes.

5. An immersion thermocouple comprising:
   a heat resistant sheathing, an interior of which is substantially filled with a heat resistant cement;
   a U-shaped tube fixed in the heat resistant cement, said U-shaped tube enclosing a thermocouple; and
   a shield circumferentially surrounding the U-shaped tube having a first end fixed in the heat resistant cement and an open second end, wherein the shield is composed of a material selected from the group consisting of fused silica and borosilicate glass.

6. The immersion thermocouple of claim 5, further including a second U-shaped tube fixed in the heat resistant cement, said second U-shaped tube bridging said first U-shaped tube at an angle of approximately ninety degrees.

7. The immersion thermocouple of claim 5, wherein the shield is composed of a material which matches the temperature coefficient of expansion of the heat resistant cement.

8. The immersion thermocouple of claim 2 or 5, wherein the space between the shield and the first and the second U-shaped tubes is substantially filled with a cement which is substantially identical to the heat resistant cement.

* * * * *